Figure 1:
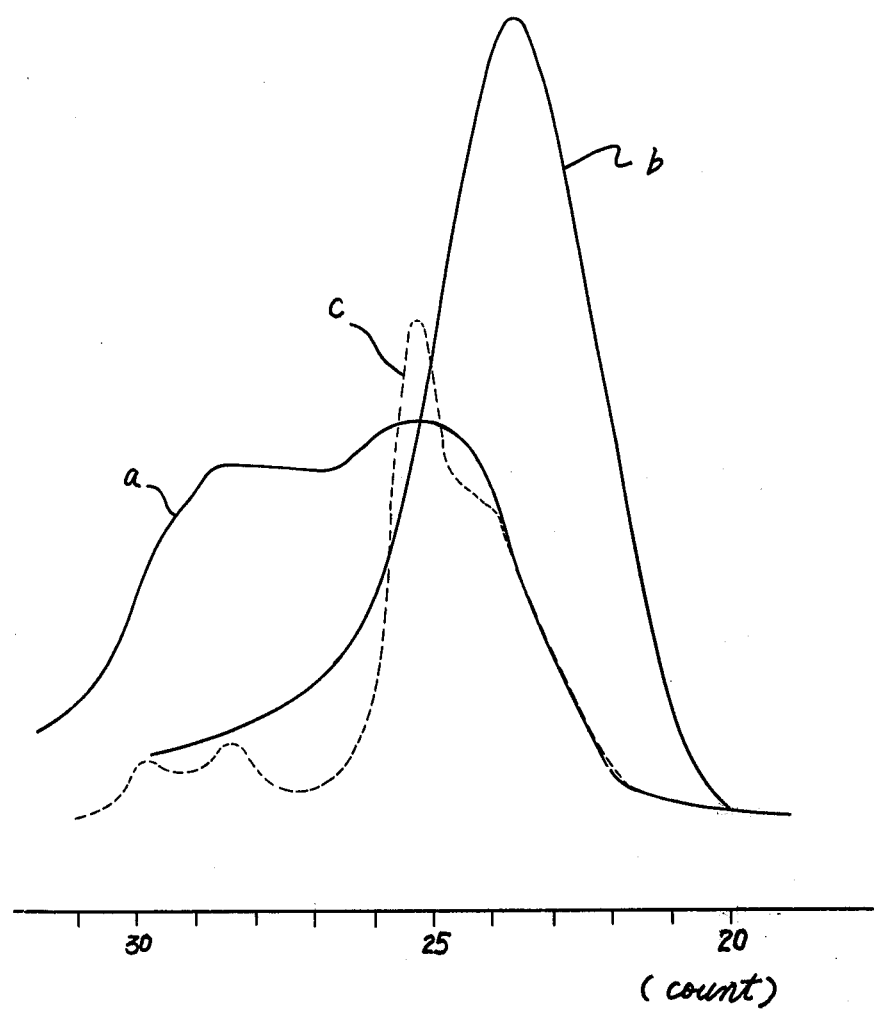

United States Patent [19]

Matsuo et al.

[11] 4,010,130

[45] Mar. 1, 1977

[54] HYDROGENATED RESIN AND COMPOSITIONS CONTAINING THE SAME

[75] Inventors: Kotaro Matsuo, Mino; Katsuhisa Shimizu, Kyoto; Michimasa Hoshiba, Takarazuka; Machio Chihara, Osaka, all of Japan

[73] Assignee: Arakawa Rinsan Kagaku Kogyo Kabushiki Kaisha, Osaki, Japan

[22] Filed: Sept. 19, 1975

[21] Appl. No.: 614,934

Related U.S. Application Data

[62] Division of Ser. No. 517,660, Oct. 24, 1974, abandoned.

[30] Foreign Application Priority Data

Oct. 24, 1973  Japan ............... 48-120236

[52] U.S. Cl. ............... 260/28.5 AV; 260/28.5 B; 260/889
[51] Int. Cl.² ............... C08L 9/00; C08L 91/06
[58] Field of Search ............ 260/83.5, 94.7 H, 889, 260/28.5 AV, 28.5 B

[56] References Cited

UNITED STATES PATENTS 2,559,790  7/1951  Peters ............... 260/83.5
2,689,232  9/1954  Gerhart ............... 260/83.5
2,689,240  9/1954  Gerhart ............... 260/83.5
2,731,370  1/1956  Tramm et al. ............... 260/28.5 B
3,673,281  6/1972  Bronstert et al. ............... 260/94.7 H

FOREIGN PATENTS OR APPLICATIONS 1,253,666  11/1971  United Kingdom ....... 260/28.5 AV

OTHER PUBLICATIONS

*Encyclopedia of Polymer Science 1 Technology* (vol. 7) (Interscience) (N.Y.) (1967), pp. 557-558, 563-566.

*Primary Examiner*—Melvyn I. Marquis
*Assistant Examiner*—H. H. Fletcher
*Attorney, Agent, or Firm*—Bierman & Bierman

[57] ABSTRACT

A hydrogenated copolymer of a cyclopentadiene and an ethylenically unsaturated ester having a softening point of up to 150° C, an iodine value of 0 to 50, a saponification value of 4 to 330, a number average molecular weight of 200 to 800 and a ratio of weight average molecular weight to number average molecular weight of 1 to 2.5; and a hotmelt composition and pressure sensitive adhesive composition containing the above hydrogenated copolymer as a tackifier.

4 Claims, 5 Drawing Figures

HYDROGENATED RESIN AND COMPOSITIONS CONTAINING THE SAME

This is a Rule 60 Divisional Application of co-pending Serial No. 517,660, filed Oct. 24, 1974, now abandoned which claims the priority of Japanese Application No. 120,236 filed Oct. 24, 1973.

This invention relates to a hydrogenated resin, more particularly to a novel hydrogenated resin useful as a tackifier in, for example, hotmelt compositions, pressure sensitive adhesive compositions and the like.

It is well known that hotmelt compositions have high-speed adhering properties, contain no solvents, are not hazardous to health, and are inflammable. Accordingly, they are extensively used for book binding, packaging and the production of plywood, wood products, shoes, electrical devices and fiber products.

At room temperature, the hotmelt composition is in the form of rods, granules or pellets which are easy to handle because they can be melted and applied to a suitable substrate. When cooled, the composition solidifies to form a joint. It is therefore desirable for the hotmelt composition to readily adhere to various substrates while possessing a low melt viscosity assuring an easy coating operation. Additionally, these compositions should resist changes in melt viscosity while avoiding the formation of crust on the surface of the hotmelt adhesive when heat-aged in the hotmelt applicator. This crust is particularly bothersome because it breaks and plugs the applicator during the application of the hotmelt adhesive to the surface of the substrate.

Conventionally, copolymers of ethylene and ethylenically unsaturated monoesters, such as copolymers of ethylenevinyl acetate or ethylene-acrylate have been used most extensively as the base polymer of hotmelt compositions of this type. However, these ethylene copolymers have a high melt viscosity and do not readily adhere to the substrate.

Therefore, it is known to use wax with the base polymer in order to lower the melt viscosity, but the use of wax impairs the adhesive strength of the resulting compositions. Further, it is also known to incorporate thermoplastic resins into the composition as a tackifier in order to improve the adherence. Examples of these thermoplastic resins include rosin and its derivatives, polyterpene resins, coumarone-indene resins, petroleum resins, etc. The most preferred are rosin esters. However, rosin esters can not be completely decolorized even if hydrogenated. They are easily discolored when heated to a high temperature for a long period of time. Therefore, they reduce the commercial value of the resulting product when incorporated into the hotmelt composition. Furthermore, there are various inconveniences in the industrial use of rosin because it is a natural product.

On the other hand, petroleum resins and coumaroneindene resins, prepared from abundant petroleum materials, are readily available. In recent years there has been a growing tendency to use them in place of rosin tackifiers. Nevertheless, these petroleum resins generally have poor compatibility with ethylene copolymers and therefore impair the flexibility of hotmelt compositions. Although hydrogenated petroleum resins or petroleum resins of the aliphatic-aromatic copolymer type are usable, the hotmelt composition obtained therefrom exhibits very poor adhesion to low polarity plastics.

Furthermore, rosin tackifiers such as rosin esters and terpene tackifiers are universally used as tackifiers for pressure sensitive adhesives containing natural or synthetic rubber as a base polymer. However, these tackifiers are disadvantageous because rosin and terpene are natural products.

An object of this invention is to provide resins which are particularly useful as substitutes for rosin and terpene tackifiers.

Another object of this invention is to provide tackifying resins, exhibiting a high tackifying effect, which are highly compatible with ethylene copolymers and with natural or synthetic rubbers.

Another object of this invention is to provide a hotmelt composition which is superior to those containing rosin esters with respect to adhesive strength, tensile strength, elongation at break, flexibility at low temperatures and thermal stability.

Still another object of this invention is to provide a pressure sensitive adhesive having excellent properties.

These and other objects of this invention will become more apparent from the following detailed description.

The hydrogenated resin of this invention is a hydrogenated copolymer of a cyclopentadiene and an ethylenically unsaturated ester having a softening point of up to 150° C, an iodine value of 0 to 50, a saponification value of 4 to 330, a number average molecular weight of 200 to 800 and a ratio of weight average molecular weight to number average molecular weight of 1 to 2.5.

The hydrogenated resin of this invention is highly compatible with ethylene copolymers and gives a hotmelt composition having excellent properties. Additionally, the present resin in composition with natural or synthetic rubber results in a pressure sensitive adhesive having excellent properties. For example, a hotmelt composition containing the hydrogenated resin of this invention as a tackifier has excellent flexibility at low temperature to room temperature. In addition, it exhibits outstanding adhesive strength on both high and low polarity substrates. Further, it possesses low melt viscosity, very good thermal stability during the application procedure, and freedom from coloration, viscosity increase and formation of crust during use for an extended length of time. In addition, the present composition can be efficiently produced in industrial quantities due to the economic availability of cyclopentadienes.

It is not yet clear why the present resins exhibit these desirable properties. In the inventor's opinion, the ester groups incorporated into the present resins render the resins highly compatible with the ethylene copolymers. This permits the composition to exhibit excellent adherence on low polarity plastic substrates. This can be understood from the examples given later. The hydrogenated cyclopentadiene homopolymer is not compatible with ethylene copolymers and a hotmelt composition comprising these polymers displays very good adhesive strength on a substrate having low polarity. Furthermore, although the resin of this invention has a relatively low molecular weight, the presence of a cyclopentane ring enables the resin to have a high softening point and a plasticizing effect as if it were rosin ester. This results in the desired flexibility in the composition.

Additionally, hydrogenation eliminates unsaturation of the resin thus improving the color and thermal stability of the resin and its solubility in aliphatic solvents.

Examples of cyclopentadienes, one of the constituent monomers of the hydrogenated resin of this invention, include cyclopentadiene and methylcyclopentadiene. Cyclopentadienes used as monomers for the copolymerization reaction with unsaturated esters further include dimers, trimers and tetramers thereof which give cyclopentadienes when heated. Among these compounds, cyclopentadiene and dicyclopentadiene are preferable for the copolymerization reaction.

Examples of the ethylenically unsaturated esters are various ethylenically unsaturated esters having at least one reactive ethylenic double bond and at least one ester bond, and include esters of saturated alcohols and unsaturated carboxylic acids, esters of unsaturated alcohols and saturated carboxylic acids and esters of unsaturated alcohols and unsaturated carboxylic acids.

Typical examples of ethylenically unsaturated esters are those represented by the formula $R^1(COOR^2)n$ wherein $R^1$ is an alkyl group having 1 to 4 carbon atoms,

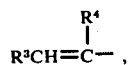

—(CH$_2$)$_p$—, phenylene, —CH=CH— or

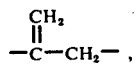

wherein $R^3$ is H, CH$_3$ or phenyl, $R^4$ is H or CH$_3$ and $p$ is an integer of 1 to 4; $n$ corresponds to the valency of the group $R^1$ and is an integer of 1 to 2; and $R^2$ is (1) —CH=CH$_2$ or —CH$_2$CH=CH$_2$ when $n$ is an integer of 1 and $R^1$ is alkyl group having 1 to 4 carbon atoms, (2) an alkyl group having 1 to 4 carbon atoms, —CH$_2$CH$_2$OH$_2$ or —CH$_2$CH=CH$_2$ when $n$ is an integer of 1 and $R^1$ is

(3) —CH$_2$CH=CH$_2$ when n is an integer of 2 and $R^1$ is —(CH$_2$)$_p$— or phenylene, or (4) an alkyl group having 1 to 4 carbon atoms or —CH$_2$CH=CH$_2$ when $n$ is an integer of 2 and $R^1$ is —CH=CH— or

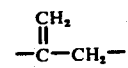

The ethylenically unsaturated esters are classified as follows.

(1) Vinyl or allyl monoesters of saturated aliphatic acids represented by the above formula wherein $R^1$ is an alkyl group having 1 to 4 carbon atoms, $n$ is an integer of 1, and $R^2$ is —CH=CH$_2$ or —CH$_2$CH=CH$_2$. Examples of these compounds are vinyl acetate, vinyl propionate, vinyl butyrate, allyl acetate, etc.

(2) Monoesters of unsaturated aliphatic or aromatic acids represented by the above formula wherein $R^1$ is

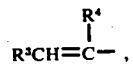

wherein $R^3$ is H, CH$_3$ or phenyl, $R^4$ is H or CH$_3$, $n$ is an integer of 1, and $R^2$ is an alkyl group having 1 to 4 carbon atoms, —CH$_2$CH$_2$OH or —CH$_2$CH=CH$_2$. Examples of these compounds are methyl acrylate, ethyl acrylate, butyl acrylate, 2-hydroxyethyl acrylate, allyl acrylate, methyl methacrylate, ethyl methacrylate, butyl methacrylate, 2-hydroxyethyl methacrylate, allyl methacrylate, methyl crotonate, allyl crotonate, methyl cinnamate, etc.

(3) Diallyl esters of aliphatic or aromatic dicarboxylic acids represented by the above formula wherein $R^1$ is —(CH$_2$)$_p$— or phenylene, $p$ is an integer of 1 to 4, $n$ is 2, and $R^2$ is —CH$_2$CH=CH$_2$. Examples of these compounds are diallyl oxalate, diallyl succinate, diallyl adipate, diallyl phthalate, etc.

(4) Diesters of aliphatic unsaturated dicarboxylic acids represented by the above formula wherein $R^1$ is —CH=CH— or

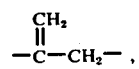

$n$ is 2, and $R^2$ is an alkyl group having 1 to 4 carbon atoms or —CH$_2$CH=CH$_2$. Examples of these compounds are dimethyl maleate, diethyl maleate, dibutyl maleate, dimethyl fumarate, diethyl fumarate, dimethyl itaconate, diethyl itaconate, diallyl maleate, diallyl fumarate, diallyl itaconate, etc.

Of all the ethylenically unsaturated esters enumerated above, the preferred esters are vinyl or allyl monoesters of saturated aliphatic acids classified in paragraph (1) and monoesters of unsaturated aliphatic or aromatic acids classified in paragraph (2). Among those classified in paragraphs (1) and (2), vinyl acetate, methyl acrylate, ethyl acrylate, butyl acrylate and methyl methacrylate are the most preferred. They are readily available on an industrial scale and copolymers having a high softening point in spite of relatively low molecular weight can be easily produced from them. Among these, vinyl acetate is especially preferred since it can be easily decolorized by hydrogenation.

The ratio of the amount of cyclopentadienes to that of unsaturated esters varies over a wide range. In fact, a hydrogenated copolymer prepared from 99 mol % of cyclopentadienes and 1 mol % of unsaturated esters is a superior tackifier than a hydrogenated cyclopentadiene homopolymer. It is of course possible to use a greater amount of the unsaturated esters. However, amounts in excess of 40 mol % are undesirable since polymerization will yield increased amounts of volatiles such as a co-dimer of cyclopentadienes and unsaturated esters, thus reducing the yield of the desired copolymer. Generally, the copolymer is preferably prepared from 60 to 99 mol % of cyclopentadienes and from 40 to 1 mol % of unsaturated esters, more preferably from 70 to 98 mol % of the former and 30 to 2 mol % of the latter, and most preferably from 70 to 90 mol % of the former and 30 to 10 mol % of the latter.

The hydrogenated resin of this invention is obtained by copolymerizing cyclopentadienes and ethylenically unsaturated esters and then hydrogenating the resulting copolymer. The polymerization of cyclopentadienes and ethylenically unsaturated esters is conducted by various known methods including the thermal polymerization disclosed in U.S. Pat. No. 2,559,790. This reference teaches the reaction of cyclopentadienes and unsaturated esters at a temperature between 180 to 350° C, preferably at 200° to 300° C, in a closed reactor. Although a solvent is not necessarily required, the reaction can be easily controlled if the reactants are diluted to a concentration of 30 to 80% with an organic solvent such as benzene, toluene, xylene, cyclohexane, ethyl acetate, butyl acetate, methyl ethyl ketone, methyl isobutyl ketone or tetrahydrofuran. The reaction time, which depends upon the reaction temperature and concentration of the reactants, is adjusted so that the softening point of the resulting resin will not be higher than 150° C. The reaction time is usually 1 to 15 hours.

There is no particular restriction as to when to add the unsaturated ester to the polymerization system. Both cyclopentadienes and unsaturated esters may be subjected to polymerization from the beginning, or the latter may be added during the course of the reaction. Alternatively, the unsaturated esters may be introduced into the reaction system after the cyclopentadienes have been polymerized, followed by the copolymerization reaction. Most preferably, both cyclopentadienes and unsaturated esters are subjected to polymerization from the beginning, whereby the unsaturated ester can be uniformly introduced into the copolymer. Furthermore, part of the ethylenically unsaturated ester can be replaced by ethylenically unsaturated hydrocarbons such as ethylene, propylene, butene, isobutene, butadiene, isoprene, piperylene, styrene, α-methylstyrene, vinyltoluene or the like. The amount of substitution of the unsaturated hydrocarbon can be up to 25 mol % based on the unsaturated ester.

After completion of the polymerization reaction, the resulting reaction mixture is subjected to distillation to remove unreacted substances, low molecular weight polymers of cyclopentadienes, low molecular weight copolymers (i.e. copolymers consisting of one molecule of an ethylenically unsaturated ester and 1 to 4 molecules of cyclopentadiene or methylcyclopentadiene), and solvent whereby the desired copolymer is obtained.

The copolymer generally has a color grade (Gardner) of 3 to 16, a softening point of up to 150° C, a saponification value of 4 to 400, an iodine value of 80 to 200, a number average molecular weight of 200 to 1000, and a ratio of weight average molecular weight to number average molecular weight of 1 to 3.

The low molecular weight copolymers obtained as a distillate by the above distillation step may be further reacted at 0° to 200° C, preferably at 50° to 150° C, in the presence of Friedel-Crafts catalyst with or without the addition of cyclopentadienes. This results in the formation of a copolymer having the same properties as the above-mentioned copolymer. Examples of Friedel-Crafts catalysts are hydrogen fluoride, phosphoric acid, sulfuric acid, boron trifluoride, ether complex and phenol complex thereof, aluminum chloride, aluminum bromide, tin tetrachloride, zinc chloride, activated clay, silica-alumina, etc. The preferred catalysts are sulfuric acid, boron trifluoride, ether complex and phenol complex thereof and aluminum chloride.

The copolymer thus obtained is then hydrogenated in a known manner. The copolymer as melted, or as dissolved in cyclohexane, tetrahydrofuran or the like, is hydrogenated for 1 to 10 hours in the presence of a hydrogenating catalyst at 0° to 300° C, preferably at 200° to 280° C, at a hydrogen pressure of atmospheric pressure to 300 kg/cm². Examples of the hydrogenating catalyst are nickel, palladium, platinum, cobalt, ruthenium, rhodium and like metal, or oxides or hydroxides thereof. These catalysts may be used with a support material such as carbon, kieselguhr or the like. It is suitable to use the hydrogenating catalyst in an amount of 0.1 to 20% by weight based on the copolymer. As a result of the hydrogenation reaction, the copolymer exhibits a greatly reduced iodine value and appears lighter in color. Depending on the reaction conditions, the copolymer will be subjected to hydrocracking which may alter other properties of the copolymer. For example, there may be a reduction in the molecular weight and saponification value of the copolymer.

The present hydrogenated resin must have a softening point of up to 150° C, an iodine value of 0 to 50, a saponification value of 4 to 330, a number average molecular weight ($\overline{M}n$) of 200 to 800, and a ratio of weight average molecular weight ($\overline{M}w$) to number average molecular weight ($R=\overline{M}w/\overline{M}n$) of 1 to 2.5. Preferably, the hydrogenated resin has a color grade (Gardner) of up to 4, most preferably up to 1, a softening point of up to 130° C, an iodine value of 0 to 30, a saponification value of 15 to 250, a $\overline{M}n$ value of 220 to 600 and an R value of 1 to 2.0. If the softening point is higher than 150° C, the resin becomes less compatible with the ethylene copolymer and rubber and is therefore undesirable. Although the preferred range for the softening point varies in accordance with the use or application of the resin, it is advantageous that the hydrogenated resin have a softening point of up to 130° C.

If the saponification value is lower than 4, the ester group incorporated into the resin will not produce an effective result and the resin will exhibit poor compatibility with the ethylene copolymer. Moreover, when such resin is formulated into a hotmelt composition along with the ethylene copolymer, the hotmelt composition shows poor tensile strength, elongation and flexibility especially at low temperatures. This results in a failure to effectively adhere to a nonpolar substrate such as polyethylene or polypropylene. If the saponification value is in excess of 330, the resin becomes less compatible with the ethylene copolymer and rubber and less resistant to alkali.

If the iodine value is higher than 50, the resin exhibits reduced resistance to heat and oxidation. This results in a hotmelt composition having an unstable viscosity while it is applied in a molten state. In addition, the composition undergoes marked discoloration and forms a crust. Furthermore, when formulated into a pressure sensitive adhesive, such resin displays poor solubility in petroleum benzin or similar aliphatic solvent which is widely used for pressure sensitive adhesives. If the $\overline{M}n$ value is higher than 800 or R is in excess of 2.5, the resin is not fully compatible with the ethylene copolymer or rubber, whereas if the $\overline{M}n$ value is lower than 200, the resin contains a volatile component and is not effective in imparting tackiness.

The hydrogenated resin of this invention is used conjointly with a base polymer such as a copolymer of ethylene to give a hotmelt composition having excellent properties. Employable for this purpose are various ethylene copolymers which are generally used as base polymers for hotmelt compositions. Typical examples are copolymers of ethylene and ethylenically unsaturated monoesters such as ethylene-vinyl acetate, ethylene-methyl acrylate, and ethylene-ethyl acrylate. Generally used are those containing 55 to 95% by weight of ethylene and having a melt index usually of 0.1 to 500, preferably of 2.5 to 400. Copolymers of ethylene and ethylenically unsaturated monoesters can be used which are prepared by copolymerizing acrylic acid or methacrylic acid with these two components. The ratio of the hydrogenated resin of this invention to the above-mentioned ethylene copolymer depends on the kind of copolymer employed and the intended use of the hotmelt composition. A generally preferred ratio is 70 to 5% by weight of hydrogenated resin to 30 to 95% by weight of ethylene copolymer.

As described above, the hotmelt composition is prepared from an ethylene copolymer and a hydrogenated copolymer of cyclopentadiene and unsaturated ester. In order to lower the melt viscosity of the composition, the composition may further contain wax such as paraffin wax, microcrystalline wax, vegetable wax, animal wax, synthetic wax (e.g., Fischer - Tropsch wax), polyethylene wax or polypropylene wax. The amount of wax is in the range of 0.1 to 3 times the total weight of the hydrogenated resin and copolymer of ethylene and ethylenically unsaturated monoester. The composition may further contain fillers such as clay, talc, calcium carbonate, barium carbonate or titanium dioxide; plasticizers such as dibutyl phthalate, dioctyl phthalate, tricresyl phosphate; and an antioxidant of the phenolic, amine, organic sulfur or organic phosphorus type.

The hotmelt composition has a very high adherence to high polarity substrates such as paper and wood and low polarity substrates such as plastics. Accordingly, it is widely used for adhering paper, paper board, plastic film or sheet; for making books, footwear, laminates, plywood; for adhering paper to metal, paper to plastics, metal to plastics; for coating paper or paper board and for sealing.

The hotmelt composition of this invention is used as an adhesive by first melting it and then applying it to the surface of a substrate by a roll coater or applicator. The coating is then pressed against the adhering article before it solidifies. It is thereafter solidified by cooling. Alternatively, the cooled coating can be reheated when ready for use. The molten coating is then pressed into contact with an article and cooled to effect solidification. If it is used as a sealing agent, it is applied to the portion to be sealed.

The hydrogenated resin of this invention along with rubber is formulated into a pressure sensitive adhesive. Examples of the rubber are natural rubber, random styrene-butadiene rubber, styrene-butadiene block copolymers, styrene-butylene block copolymers, styrene-isoprene block copolymers, styrene-ethylene-propylene block copolymers, polyisoprene rubber, polybutadiene rubber, polyisobutylene and the like. The amount of hydrogenated resin used is in the range of 20 to 80% by weight, preferably 30 to 70% by weight of the hydrogenated resin to 20 to 80% by weight, preferably 30 to 70% by weight of rubber. As already described with the hotmelt composition, fillers and antioxidants can be incorporated into the pressure sensitive adhesive.

The pressure sensitive adhesive composition of this invention is applied, as dissolved in toluene, petroleum benzin or like solvent or in molten state, to a substrate in the form of a sheet or film. Examples of sheet-like substrates are paper, plastic film, plastic sheet, fabric, nonwoven fabric, wood panel, glass plate, rubber sheet, synthetic paper and the like.

For a better understanding of this invention, examples for preparing the hydrogenated resin of this invention and examples of using the same are given below.

These examples are set forth for illustrative purposes and are not limitative in any way. The softening point, color grade, iodine value, saponification value and molecular weight referred to throughout the specification and claims are determined according to the following methods.

1. Softening point: ASTM E 28-58T (Ring and ball method)
2. Color grade: ASTM D 1544-58T (Gardner color)
3. Iodine value: ASTM D 1959-61 (Wijs method)
4. Saponification value: JIS K 0070-1966
5. Molecular weight:
   Apparatus: "Shimadzu Gel Permeation Chromatograph Model IA" (Manufactured by Shimadzu Seisakusho Limited, Japan)
   Sample: 0.3 wt.% solution in tetrahydrofuran
   Injection amount: 2 ml
   Injection time: 2 minutes
   Flow rate: 1 ml/min.
   Gel column: SG 3-2-1-1. The pore sizes of four gel columns, SG-3-2-1-1, were $4 \times 10^3$ A, $2 \times 10^2$ A, $2 \times 10$ A and $2 \times 10$ A respectively.

The molecular weights were all calculated by using a calibration curve made by means of standard polystyrenes of known molecular weight.

In the following examples, the percentages are all by weight and the drawings referred to are as follows.

Figure 2:
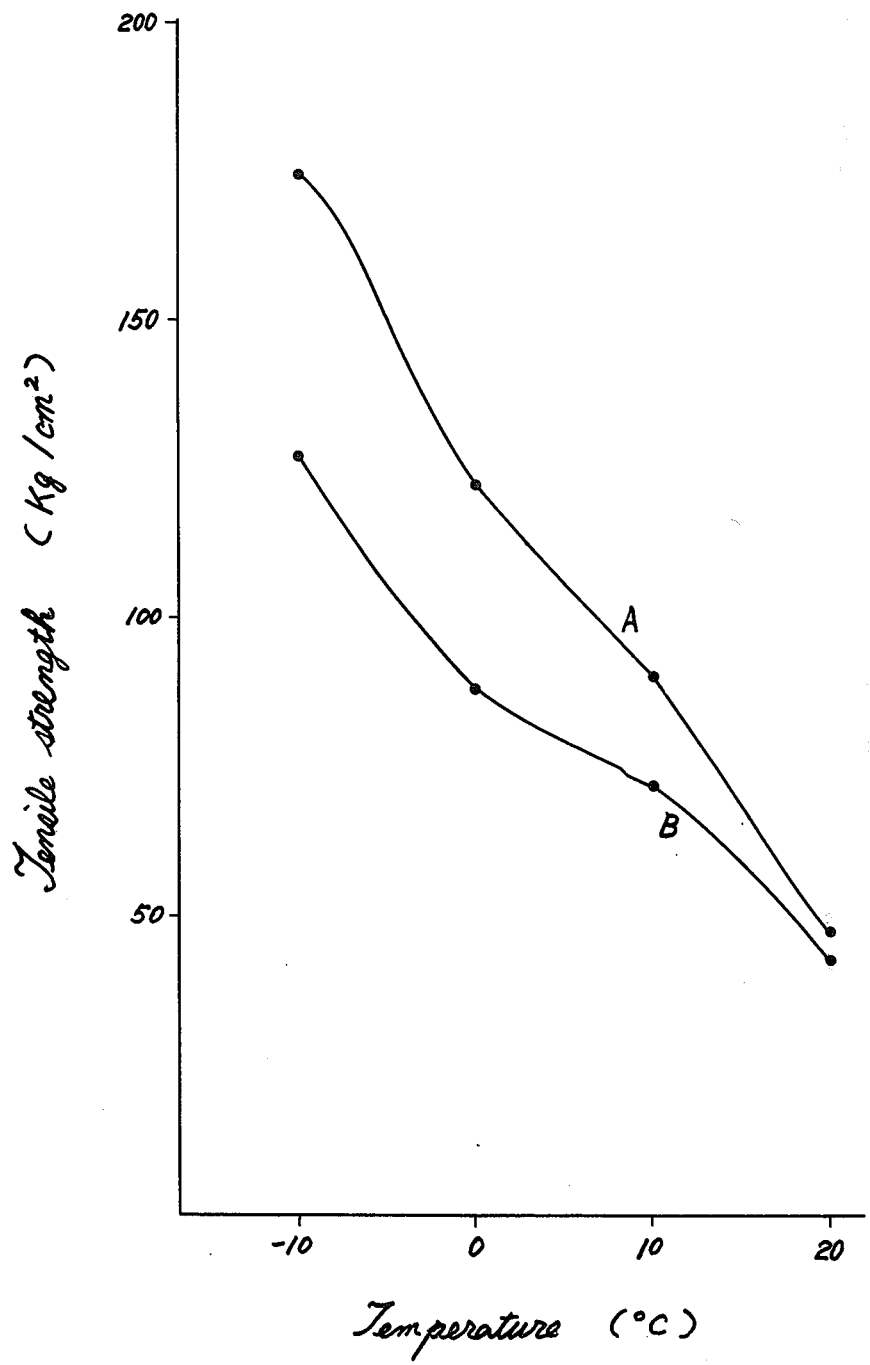
Figure 3:
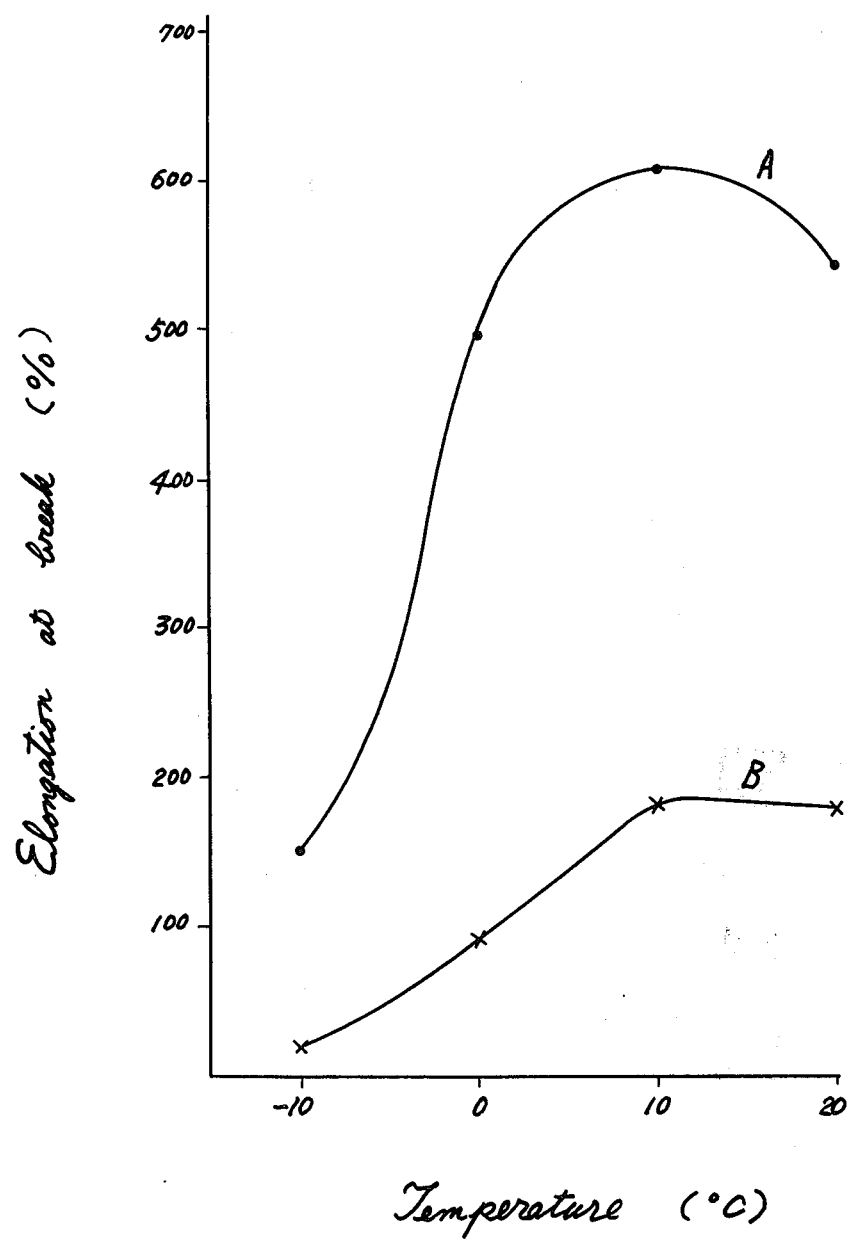
Figure 4:
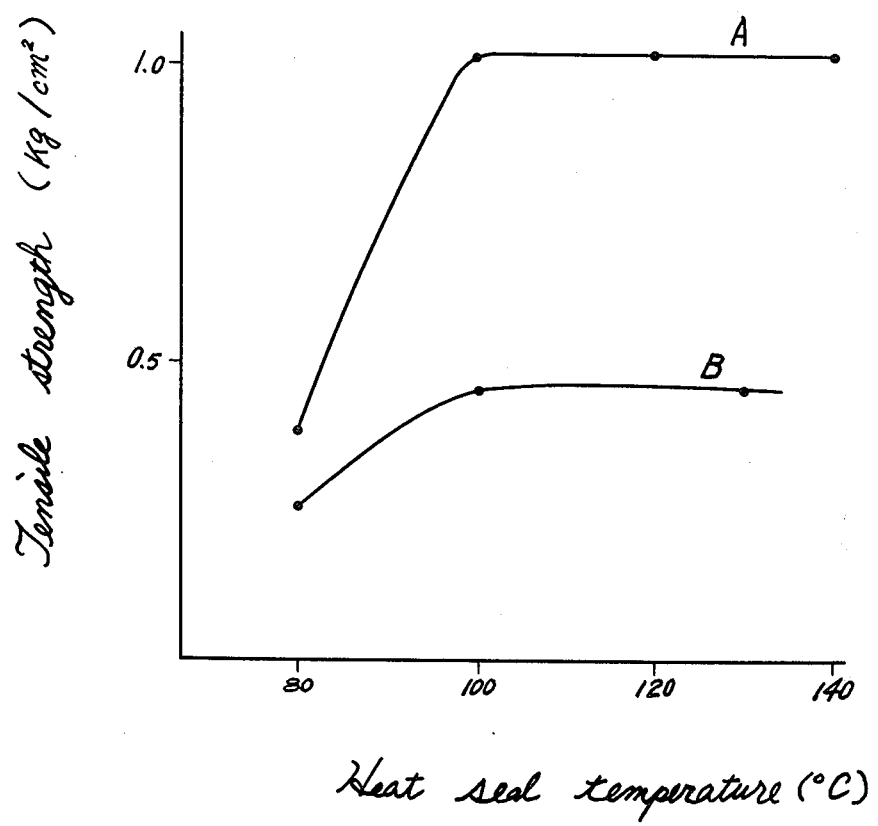
Figure 5:
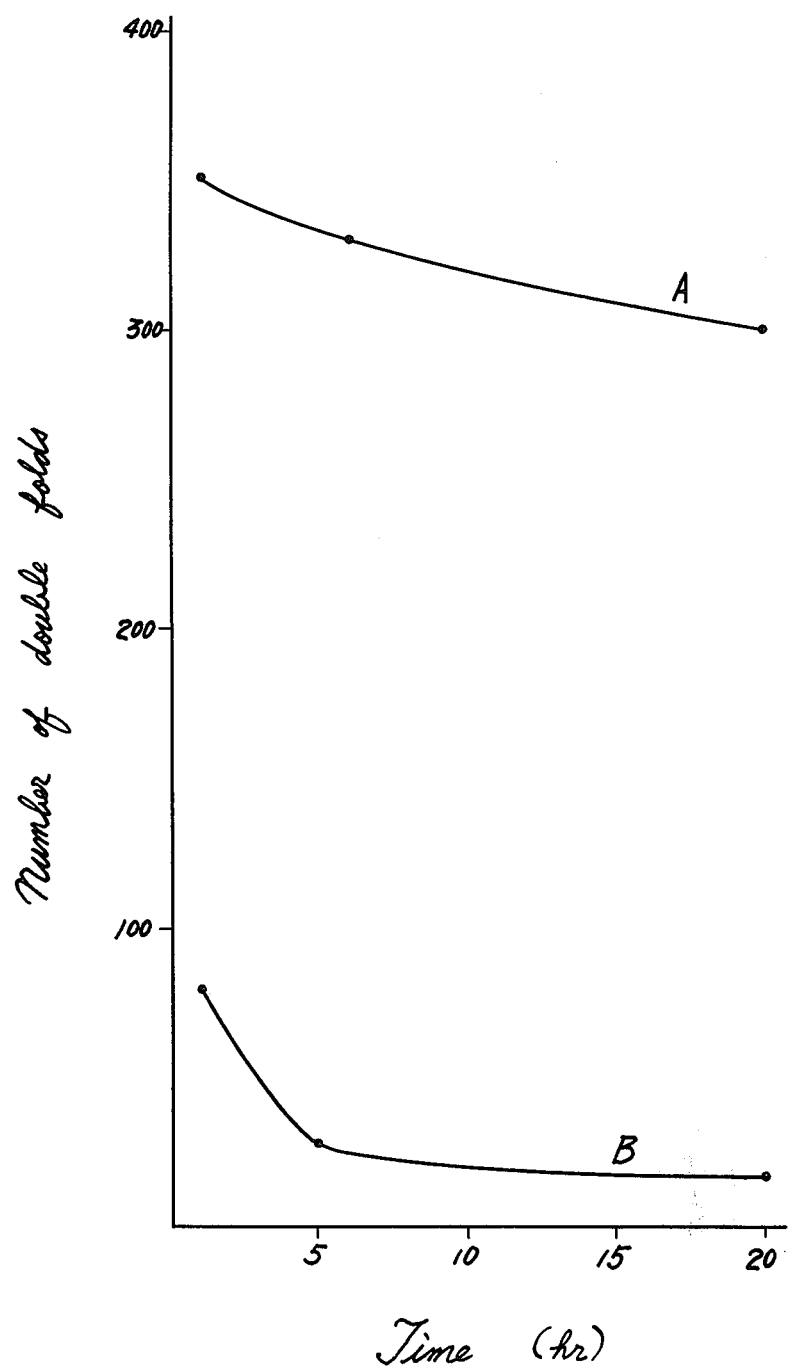

FIG. 1 shows curves representing the distribution of molecular weights;
FIG. 2 is a graph representing tensile strength;
FIG. 3 is a graph representing elongation at break;
FIG. 4 is a graph representing adhesive strength; and
FIG. 5 is a graph showing folding endurance;

In FIGS. 2 to 5, Curve A shows the results obtained by using the hydrogenated resin of Example 14 and Curve B shows the results obtained by using the hydrogenated resin of Comparison Example 1.

EXAMPLE 1

647 g of xylene, 859 g of dicyclopentadiene and 112 g of vinyl acetate were placed into a 3-liter autoclave equipped with a stirrer, thermometer and inlet for nitrogen and stirred until a uniform mixture was obtained. The air in the autoclave was then replaced by nitrogen. The reaction system was sealed, heated to 270° C with stirring and thereafter reacted at the same temperature for 2 hours. After cooling, the reaction mixture was taken out and distilled at a reduced pressure of 5mmHg at a bottom temperature of 240° C. This procedure resulted in the removal of xylene, unreacted substances and low molecular weight reaction products. 867 g of a yellowish brown resin was obtained. The resin had a softening point of 101° C, a color grade of 9 and an iodine value of 139.

Subsequently, 350 g of the resin, 450 ml of cyclohexane and 3.5 g of nickel-kieselguhr catalyst were placed into a 2-liter autoclave equipped with a stirrer, thermometer and inlet for hydrogen to hydrogenate the resin at a hydrogen pressure of 100 kg/cm² at a temperature of 250° C for 3 hours. After cooling, the reaction mixture was taken out, filtered to remove the catalyst and subjected to distillation at a reduced pressure of 5 mmHg at a bottom temperature of 200° C to distill off cyclohexane and volatile materials. 340 g of a colorless transparent resin was obtained. The hydrogenated resin thus prepared had a softening point of 99.5° C., a color grade of up to 1, an iodine value of 16, a saponification value of 59, a number average molecular weight ($\overline{M}n$)

of 318, and a ratio of weight average molecular weight to number average molecular weight ($\overline{Mw}/\overline{Mn}$) of 1.52.

EXAMPLE 2

204 g of xylene, 254 g of dicyclopentadiene and 50 g of vinyl acetate were placed into a 1-liter autoclave and stirred until a uniform mixture was obtained. The air in the autoclave was then replaced by nitrogen. The reaction system was sealed, heated to 270° C with stirring and thereafter reacted at the same temperature for 3 hours. After cooling, the reaction mixture was treated in the same manner as in Example 1 to obtain 262 g of a brown resin, having a softening point of 123° C, a color grade of 13 and an iodine value of 162.

Subsequently, 200 g of the resin, 250 ml of cyclohexane and 4.0 g of nickel-kieselguhr catalyst were placed into a 2-liter autoclave, in which the resin was hydrogenated as in Example 1, to obtain 193 g of a colorless transparent resin. The resulting hydrogenated resin had a softening point of 115° C, a color grade of up to 1, an iodine value of 24, a saponification value of 74, a $\overline{Mn}$ value of 405 and a $\overline{Mw}/\overline{Mn}$ ratio of 1.81.

FIG. 1 shows a curve (a) demonstrating the distribution of the molecular weight of the resin using a gel permeation chromatograph Model IA (product of Shimadzu Seisakusho Limited, Japan). The results are achieved by dissolving the hydrogenated resin (having a softening point of 115° C and prepared in accordance with Example 2) in tetrahydrofuran at a concentration of 0.3%. Curve (b), shown for comparison, represents the results obtained with an aromatic petroleum resin ("Petrosin-120," product of Mitsui Petrochemical Co., Ltd., Japan) having nearly the same softening point. Curve (c) is the result obtained with pentaerythritol ester of polymerized rosin (softening point: 120° C). It will be seen that the hydrogenated resin of this invention shows low molecular distribution and is lower in molecular weight than the comparative synthetic resin which has the same softening point.

EXAMPLE 3

735 g of xylene, 793 g of dicyclopentadiene and 310 g of vinyl acetate were placed into a 3-liter autoclave and stirred until a uniform mixture was obtained. The air in the autoclave was then replaced by nitrogen. The reaction system was sealed, heated to 280° C with stirring and thereafter reacted at the same temperature for 5 hours. The reaction mixture was treated in the same manner as in Example 1 to obtain 1000 g of a brown resin, having a softening point of 94° C, a color grade of 15 and an iodine value of 127.

Subsequently, 300 g of the resin, 300 ml of cyclohexane and 3 g of nickel-kieselguhr catalyst were placed into a 2-liter autoclave, in which the resin was hydrogenated as Example 1, to obtain 276 g of a pale yellow and transparent resin. This hydrogenated resin had a softening point of 100° C, a color grade of 2, an iodine value of 26, a saponification value of 133, a $\overline{Mn}$ value of 463 and a $\overline{Mw}/\overline{Mn}$ ratio of 1.98.

EXAMPLE 4

1091 g of xylene, 661 g of dicyclopentadiene and 430 g of vinyl acetate were placed into a 3-liter autoclave and stirred until a uniform mixture was obtained. The air in the autoclave was then replaced by nitrogen. The reaction system was sealed, heated to 260° C with stirring and thereafter reacted at the same temperature for 3 hours. The reaction mixture was treated in the same manner as Example 1 to obtain 436 g of a yellow resin, having a slight fluidity at room temperature, a color grade of 4 and an iodine value of 83.

Subsequently, 100 g of the resin and 0.5 g of nickel-kieselguhr catalyst were placed into a 1-liter autoclave, in which the resin was hydrogenated as in Example 1, to obtain 93 g of an almost colorless transparent resin which had slight fluidity at room temperature. The hydrogenated resin had a color grade of 1, an iodine value of 17, a saponification value of 160, a $\overline{Mn}$ value of 241, and a $\overline{Mw}/\overline{Mn}$ ratio of 1.13.

EXAMPLE 5

300 g of xylene, 264 g of dicyclopentadiene and 36 g of methyl acrylate were placed into a 1-liter autoclave and stirred until a uniform mixture was obtained. The air in the autoclave was then replaced by nitrogen. The reaction system was sealed, heated to 260° C with stirring and thereafter reacted at the same temperature for 3 hours. After cooling, the reaction mixture was treated in the same manner as Example 1 to obtain 255 g of a yellowish brown resin, having a softening point of 103.5° C, a color grade of 6 and an iodine value of 157.

Subsequently, 100 g of the resin and 1 g of nickel-kieselguhr catalyst were placed into a 1-liter autoclave, in which the resin was hydrogenated as Example 1, to obtain 94 g of a pale yellow and transparent resin. The hydrogenated resin had a softening point of 93° C, a color grade of 2, an iodine value of 28, a saponification value of 20, a $\overline{Mn}$ value of 315, and a $\overline{Mw}/\overline{Mn}$ ratio of 1.44.

EXAMPLE 6

306 g of xylene, 220 g of dicyclopentadiene and 86 g of methyl acrylate were placed into a 1-liter autoclave and treated in the same manner as Example 5 to obtain 210 g of a yellowish brown resin. The resin had slight fluidity at room temperature, a color grade of 6 and an iodine value of 104.

Subsequently, 100 g of the resin and 1 g of nickel-kieselguhr catalyst were placed into a 1-liter autoclave, in which the resin was hydrogenated as in Example 1, to obtain 94 g of an almost colorless transparent resin which had slight fluidity at room temperature. The hydrogenated resin thus prepared had a color grade of 1, an iodine value of 17, a saponification value of 50, a $\overline{Mn}$ value of 255, and a $\overline{Mw}/\overline{Mn}$ ratio of 1.24.

EXAMPLE 7

254 g of xylene, 220 g of dicyclopentadiene and 34 g of methyl methacrylate were placed into a 1-liter autoclave and were treated in the same manner as Example 5 to obtain 221 g of a brown resin, having a softening point of 102° C, a color grade of 11 and an iodine value of 155.

Subsequently, 100 g of the resin and 1 g of nickel-kieselguhr catalyst were placed into a 1-liter autoclave, in which the resin was hydrogenated as in Example 1, to obtain 92 g of a pale yellow and transparent resin. The hydrogenated resin had a softening point of 90.5° C, a color grade of 2, an iodine value of 25, a saponification value of 22, a $\overline{Mn}$ value of 322, and a $\overline{Mw}/\overline{Mn}$ ratio of 1.43.

EXAMPLE 8

250 g of xylene, 158 g of dicyclopentadiene and 92 g of butyl acrylate were placed into a 1-liter autoclave and were stirred until a uniform mixture was obtained.

The air in the autoclave was then replaced by nitrogen. The reaction system was sealed, heated to 260° C with stirring and thereafter reacted at the same temperature for 3 hours. After cooling, the reaction mixture was treated in the same manner as Example 1 to obtain 196 g of a yellowish brown resin, which was viscous at room temperature. The resin had a color grade of 6, an iodine value of 108.5, a $\overline{Mn}$ value of 294 and a $\overline{Mw}/\overline{Mn}$ ratio of 1.27.

Subsequently, 100 g of the resin and 1 g of nickel-kieselguhr catalyst were placed into a 1-liter autoclave, in which the resin was hydrogenated as in Example 1, to obtain 94 g of a colorless, transparent and consistent resin. The hydrogenated resin had a color grade of up to 1, an iodine value of 15.0, a saponification value of 54, a $\overline{Mn}$ value of 295 and a $\overline{Mw}/\overline{Mn}$ ratio of 1.27.

EXAMPLE 9

225 g of cyclopentadiene, 146 g of methyl acrylate and 297 g of xylene were placed into a 1-liter autoclave while the air in the autoclave was replaced by nitrogen. The mixture was heated at 200° C and reacted for 4 hours with stirring. After cooling, the reaction mixture was distilled to remove xylene, dicyclopentadiene, methyl acrylate, 1:1 Diels-Alder addition product of cyclopentadiene and methyl acrylate and tricyclopentadiene which were boiling up to 120° C/5 mmHg, whereby 185 g of a yellowish brown liquid was obtained as a residue.

75 g of the residue obtained above were placed into a 300 ml four-necked flask equipped with a stirrer, dropping funnel and thermometer. 25 g of tetrachloroethane were further added thereto, followed by stirring to obtain a uniform mixture. While maintaining the mixture at 20° C, 2.5 g of boron trifluoride-phenol complex (containing 30% by weight of boron trifluoride) were added dropwise over a period of 15 minutes. After completion of the dropwise addition, the resulting mixture was heated and reacted at the boiling temperature for 2 hours. After completion of reaction, 6 g of a mixture of calcium hydroxide and water (3:1) were added to the reaction mixture to inactivate the catalyst, which was then filtered off. Subsequently, the filtrate was distilled until the temperature reached 210° C/5 mmHg to evaporate off tetrachloroethane and products of low polymerization degree. 73.5 g of a dark brown resin were obtained which had a color grade above 18 and a softening point of 92.5° C.

50 g of the resin, 100 g of cyclohexane and 4 g of nickel-kieselguhr catalyst were placed into 1-liter autoclave and the resin was hydrogenated in the same manner as Example 1 to prepare 43 g of a pale yellow and transparent resin, having a softening point of 91.0° C, a color grade of 3, an iodine value 12.1, a saponification value of 195, a $\overline{Mn}$ value of 335, and a $\overline{Mw}/\overline{Mn}$ ratio of 1.19

Comparison Example 1

1 kg of xylene and 1 kg of dicyclopentadiene were placed into a 3-liter autoclave and stirred until a uniform mixture was obtained. The air in the autoclave was then replaced by nitrogen. The reaction system was sealed, heated to 250° C with stirring and thereafter reacted at the same temperature for 4 hours. After cooling, the reaction mixture was treated in the same manner as Example 1 to obtain 830 g of a yellow resin, having a softening point of 98° C, a color grade of 4 and an iodine value of 145.

Subsequently, 100 g of the resin, 100 ml of cyclohexane and 0.5 g of nickel-kieselguhr catalyst were placed into a 1-liter autoclave, in which the resin was hydrogenated for 3 hours at a hydrogen pressure of 100 kg/cm² and a temperature of 270° C. After hydrogenation, the reaction mixture was treated in the same manner as Example 1 to obtain 75 g of a colorless transparent resin. The hydrogenated resin had a softening point of 98.5° C, a color grade of up to 1, an iodine value of 20, a $\overline{Mn}$ value of 420 and a $\overline{Mw}/\overline{Mn}$ ratio of 1.25.

EXAMPLE 10

2 g of each of the hydrogenated resins obtained in Examples 1 to 9 were placed into individual test tubes measuring 1.5 cm in diameter and 16.5 cm in depth. 2 g of ethylene-vinyl acetate copolymer containing 28% by weight of vinyl acetate and having a melt index of 150 g/10 min. ("Everflex 220," product of Mitsui Polychemical Co., Ltd., Japan) were added to each of the test tubes. The resin and copolymer were melted until a uniform mixture was obtained to prepare a hotmelt composition according to this invention. Additionally, hotmelt compositions were prepared according to this invention in the same manner as above except that 2 g of a ethylene-vinyl acetate copolymer containing 33% by weight of vinyl acetate and having a melt index of 30 g/10 min. ("Everflex 150," product of the same company as above) were used in place of the above copolymer.

The hotmelt compositions were heated to 250° C and then left to stand for cooling to determine the compatibility of the resin with the ethylene-vinyl acetate copolymer (EVA). The temperature at which the composition reached partial or complete clouding was measured as the cloud point. The smaller the numerical value of the cloud point, the greater the compatibility of the composition. For comparison, compatibility was determined in the same manner as above except that the above hydrogenated resins were replaced by the hydrogenated polycyclopentadiene obtained in Comparison Example 1, glycerin ester of hydrogenated rosin (softening point: 77.5° C), aliphatic petroleum resin ("Piccopale-100," product of Pennsylvania Industrial Chemical Corporation, U.S.A., softening point 100° C), aromatic petroleum resin ("Petrosin-120," product of Mitsui Petrochemical Inc. Ltd., Japan, softening point: 120° C) and the unhydrogenated resin obtained in Example 1. The results are shown in Table 1.

Table 1

| Kind of resin | Compatibility with EVA (cloud point: ° C) | |
|---|---|---|
| | Everflex-220 | Everflex-150 |
| Hydrogenated resin of: | | |
| Example 1 | 36 | 63 |
| Example 2 | 37 | 66 |
| Example 3 | 38 | <35 |
| Example 4 | <35 | <35 |
| Example 5 | <35 | <35 |
| Example 6 | 38 | <35 |
| Example 7 | 37 | <35 |
| Example 8 | <35 | <35 |
| Example 9 | <35 | <35 |
| Com. Ex. 1 | 123 | >200 |
| Glycerin ester of hydrogenated rosin | 43 | <35 |
| Aliphatic petroleum resin | >200 | 103 |
| Aromatic petroleum resin | >200 | >200 |
| Unhydrogenated resin of | | |

Table 1-continued

| | Compatibility with EVA *1) (cloud point: ° C) | |
|---|---|---|
| Kind of resin | Everflex-220 | Everflex-150 |
| Example 1 | *2) | *2) |

Note:
*1) EVA: ethylene-vinyl acetate copolymer.
*2) A crust was formed during melting and the composition was further polymerized. Therefore, this resin was unfit for use as a hotmelt composition.

EXAMPLE 11

30 parts by weight of ethylene-vinyl acetate copolymer ("Everflex 220," the same as in Example 10) and 20 parts by weight of paraffin wax ("HM-2050," product of Nippon Seiro Co., Ltd., Japan) were added in a molten state to 50 parts by weight of each of the hydrogenated resins obtained in Examples 1 to 7 and Comparison Example 1, the glycerin ester of hydrogenated rosin, the aliphatic petroleum resin, and the aromatic petroleum resin used for comparison in Example 10. The ingredients were uniformly mixed together to prepared hotmelt compositions.

Each of the hotmelt compositions were preheated to 180° C and were poured onto bleached sulfite paper (weighing 87 g/m$^2$) which had been placed on a hot plate whose surface temperature had been adjusted to about 150° C. The composition was immediately spread over the paper by an applicator until a thickness of 2 mils was obtained. The coating was then left standing to effect cooling. Subsequently, the coating was pressed against each of the substrates listed in Table 2, using a heat sealer manufactured by Toyo Tester Co., Ltd., Japan, at a heat-seal temperature of 130° C and a pressure of 200 g/cm$^2$ for 1 second. After pressing, the resulting specimen was left standing at 20° C and 65% R.H. for 24 hours. After this procedure, the specimen was cut to a test piece measuring 25 mm by 150 mm. The adhesive strength of the test piece was measured by 180° peel test at a peeling speed of 15 mm/min. using a Tensilon tester, Model UTM-III (product of Toyo Measuring Instruments Co., Ltd., Japan). The results are shown in Table 2.

Table 2

| | Peel strength (g/25 mm) | | |
|---|---|---|---|
| Kind of resin | Cellophane | Al foil | Polypropylene film |
| Hydrogenated resin of: | | | |
| Example 1 | 1000 | 680 | 620 |
| Example 2 | 1010 | 680 | 650 |
| Example 3 | 1010 | 690 | 680 |
| Example 4 | 1050 | 700 | 690 |
| Example 5 | 940 | 650 | 610 |
| Example 6 | 930 | 690 | 650 |
| Example 7 | 950 | 610 | 610 |
| Com. Ex. 1 | 450 | 260 | 20 |
| Glycerin ester of hydrogenated rosin | 980 | 680 | 670 |
| Aliphatic petroleum resin | 320 | 180 | 0 |
| Aromatic petroleum resin | 300 | 140 | 0 |

The bleached sulfite paper splits if the value in Table 2 is higher than 900 for cellophane, higher than 600 for aluminum foil or higher than 600 for polypropylene film.

EXAMPLE 12

35 parts by weight of ethylene-vinyl acetate copolymer (containing 28% by weight of vinyl acetate and having a melt index of 400 g/10 min.) in a molten state were uniformly mixed with 65 parts by weight of each of the hydrogenated resins obtained in Examples 1 to 9 to prepare hotmelt compositions. In the same manner as Example 11, adhesive strengths of the compositions were measured and all showed excellent results.

EXAMPLE 13

Hotmelt compositions were prepared in the same manner as Example 11 using the hydrogenated resin obtained in Example 1, pentaerythritol ester of rosin (softening point: 100° C) and aromatic petroleum resin. Each of the compositions was heated to 150° C and compression molded into a film having a thickness of 0.5 mm. The film was slowly cooled at 20° C at 65% R.H., then left to stand in the same atmosphere for 20 hours and thereafter cut into a rectangular test piece measuring 15 mm by 65 mm.

A MIT-type tester (product of Toyo Seiki Seisakusho Co., Ltd., Japan) was used to determine the folding endurance of the test piece, according to JIS P-8115 by counting the number of double folds required to sever the test piece. The results are shown in Table 3.

Table 3

| Kind of Resin | Number of double folds |
|---|---|
| Hydrogenated resin of Example 1 | 398 |
| Aromatic petroleum resin | 4 |
| Pentaerythritol ester of rosin | 403 |

EXAMPLE 14

816 g of xylene, 1016 g of cyclopentadiene and 200 g of vinyl acetate were placed into a 3-liter autoclave and stirred until a uniform mixture was obtained. The air in the autoclave was then replaced by nitrogen. The reaction system was sealed, heated, heated to 260° C with stirring and thereafter reacted at the same temperature for 4 hours. After cooling, the reaction mixture was treated in the same manner as Example 1 to obtain 918 g of a yellow resin, having a softening point of 101.5° C, a color grade of 7, an iodine value of 153, a saponification value of 94, a Mn value of 301 and an R of 1.74.

Subsequently, 100 g of the resin were placed into a 1-liter autoclave along with 1 g of nickel-kieselguhr catalyst and hydrogenated for 3 hours at a temperature of 250° C at a hydrogen pressure of 100 kg/cm$^2$. After completion of hydrogenation, the reaction mixture was treated in the same manner as Example 1 to obtain 94.5 g of a colorless transparent resin. The hydrogenated resin had a softening point of 99.5° C, a color grade of up to 1, an iodine value of 22, a saponification value of 46, a Mn value of 271 and an R of 1.68.

The compatibility (cloud point) of the thus obtained hydrogenated resin and hydrogenated polycyclopentadiene (Comparison Example 1) with various ethylene-vinyl acetate copolymers (EVA) was determined in the same manner as Example 10 with results as shown in Table 4.

Table 5

| Example | Starting materials Cyclopentadiene | Ethylenically unsaturated ester | Yield of resin (%) | Resin constant Color grade | Softening point (°C) | Iodine value |
|---|---|---|---|---|---|---|
| 15 | DCPD (1030 g) | MA (199 g) | 82.5 | 6 | 84 | 141 |
| 16 | DCPD (1003 g) | MMA (228 g) | 84.0 | 12 | 101.5 | 164 |

Note:
DCPD: dicyclopentadiene
MA: methyl acrylate
MMA: methyl methacrylate

Table 4

| Kind of EVA | | | | | |
|---|---|---|---|---|---|
| Vinyl acetate content (wt. %) | 19 | 28 | 28 | 28 | 33 |
| Melt index (g/10 min.) | 150 | 400 | 150 | 15 | 30 |
| Compatibility with EVA (cloud point, °C) | | | | | |
| Hydrogenated resin of Example 14 | 47 | 36 | 36 | 38 | 32 |
| Hydrogenated resin of Comp. Ex. 1 | 44 | 116 | 123 | 130 | >200 |

Subsequently, 400 g of each of these resins were placed into a 2-liter autoclave along with 4 g of nickelkieselguhr earth catalyst and hydrogenated at a temperature of 270° C and hydrogen pressure of 100 kg/cm² for 3 hours. After completion of hydrogenation, the reaction mixture was treated in the same manner as Example 1. The results are shown in Table 6.

Table 6

| | Amount of hydrogen absorbed (Nl/100g) | Yield of resin (%) | Hydrogenated resin constant Color grade | Softening point (°C) | Iodine value | Saponification value | Mn | R |
|---|---|---|---|---|---|---|---|---|
| Example 15 | 14.2 | 92 | 4 | 80 | 25 | 26 | 368 | 1.71 |
| Example 16 | 14.4 | 94 | 3 | 98.5 | 32 | 17 | 459 | 2.40 |

40 parts by weight of "Everflex 220" and 20 parts by weight of "HM-2050" in a molten state were uniformly mixed with 40 parts by weight of each of the hydrogenated resins of this example and the hydrogenated resin of Comparison Example 1 to prepare hotmelt compositions. According to ASTM D 638-61T, each of the compositions was made into a film, having a thickness of 0.5 mm. Specimens for tension testing was prepared by stamping with a type III die. The specimen was tested on a Tensilon tester, Model UTM-III (product of Toyo Measuring Instruments Co., Ltd., Japan) to determine the tensile strength and elongation at break thereof at various temperatures ranging from −10 to +20° C (tension rate: 100 mm/min. span: 40 mm). The results are shown in FIGS. 2 and 3. The adhesive strength on cellophane of each of the hydrogenated resins of this example and the hydrogenated resin of Comparison Example 1 was determined in the same manner as Example 11, except that the heat-seal temperature was varied. The results are shown in FIG. 4. The folding endurance of each of the hydrogenated resins of this example and the hydrogenated resin of Comparison Example 1 was determined in the same manner as Example 13, except that the time from the beginning of moisture adjustment was varied. The results are shown in FIG. 5.

EXAMPLES 15 and 16

The starting materials listed in Table 5 were placed into a 3-liter autoclave and thereafter xylene was added to prepare a 60% solution. The air in the autoclave was replaced with nitrogen. The reaction system was then sealed, heated to 260° C with stirring and thereafter reacted at the same temperature for 4 hours. The thus obtained reaction mixture was treated in the same manner as Example 1. The results are shown in Table 5.

Various test solutions were prepared in the following manner. 60 g of natural rubber ("Pale Crape No. 1," Mooney viscosity: 56) were added to individual 40 g samples of each of the hydrogenated resins obtained in Examples 14 – 16. Additionally, 60 g of the above-mentioned natural rubber were added to a 40 g sample of a glycerin ester of hydrogenated rosin ("Pentalyn H," Hercules Inc., softening point: 90° C). All of the resulting mixtures were dissolved in 400 g of petroleum benzin to prepare uniform solutions.

The solutions were applied by an applicator at 20° C to a polyester film (trade mark: "Lumirror," product of Toray Industries, Japan) to achieve a thickness of 30μ in order to prepare a pressure sensitive adhesive tape. The tape was then dried at 60° C at 35 mmHg for 1 hour, left to stand at 20° C and 65% R.H. for 12 hours, and then tested at 20° C for tackiness, adhesion and cohesion. The results are shown in Table 7.

After the application of the composition, the adhesive tape was left to stand at 70° C for 3 days or 6 days in an air oven and thereafter maintained at 20° C for 12 hours. The tape was then similarly tested to determine degradation due to aging. The results are shown in Table 7.

The properties of the adhesive tape were determined by the following methods as specified by Pressure Sensitive Tape Council (PSTC).

Tackiness:
A polyester film, 25 × 300 mm, was coated with the adhesive composition by an applicator. The thus obtained tape was tested to measure tackiness in accordance with the method of PSTC-6. The polyester film was placed on a horizontal plate having its coated surface facing up. Another plate, extending upward at an angle of 30°, was placed at one end of the polyester film. A steel ball 15 mm in diameter was rolled down the oblique plate from a position 10 cm from the bottom of the plate. The distance covered by the steel ball rolling along the adhesive surface of the polyester film was measured. The smaller the measured value, the better the result.

Adhesion:

A polyester film, 15 mm in width, was coated with the adhesive composition by an applicator to prepare an adhesive tape. As specified under PSTC-1, the tape was adhered to a stainless steel panel and the panel was placed on a Tensilon tester, UTM-III model (manufactured by Toyo Measuring Instruments Co., Ltd., Japan). The tape was subjected to a peeling test at an angle of 180° C at 300 mm/min. to measure the load required for peeling.

Cohesion:

A polyester film, 15 mm in width, was coated with the adhesive composition to prepare an adhesive tape. The test piece was adhered to a glass panel over an area of 15 × 5 mm, and the panel was placed on the same Tensilon tester as above. The tape was subjected to a shearing tension test at a constant speed of 5 mm/min. The load required to displace the adhered test piece from its original position on the glass panel was determined.

Table 7

| No of Resin in adhesive | Tackiness (cm) | Adhesion (g/15 mm) | Cohesion (g/15 × 5 mm²) |
| --- | --- | --- | --- |
| Example 14 | | | |
| * | 8.8 | 630 | 1400 |
| 70° C × 3 days | 10.0 | 750 | 990 |
| 70° C × 6 days | 9.5 | 720 | 800 |
| Example 15 | | | |
| * | 8.8 | 510 | 1230 |
| 70° C × 3 days | 9.0 | 640 | 950 |
| 70° C × 6 days | 9.2 | 780 | 820 |
| Example 16 | | | |
| * | 9.0 | 625 | 1300 |
| 70° C × 3 days | 10.0 | 700 | 960 |
| 70° C × 6 days | 10.2 | 690 | 800 |
| Pentalyn H | | | |
| * | 7.5 | 700 | 1070 |
| 70° C × 3 days | 12.0 | 800 | 600 |
| 70° C × 6 days | >30 | 650 | 320 |

Note:
* The tape was left to stand at 20° C and 65% R.H. for 12 hours, and then tested.

What we claim is:

1. A hotmelt composition containing a copolymer of ethylene and ethylenically unsaturated monoester in an amount of 30 to 95% by weight and a tackifier in an amount of 70 to 5% by weight, said tackifier being a hydrogenated copolymer of a cyclopentadiene and an ethylenically unsaturated ester having a softening point of up to 150° C, an iodine value of 0 to 50, a saponification value of 4 to 330, a number average molecular weight of 200 to 800 and a ratio of weight average molecular weight to number average molecular weight of 1 to 2.5.

2. The hotmelt composition according to claim 1 wherein said copolymer of ethylene and ethylenically unsaturated monoester contains 55 to 95% by weight of ethylene and has a melt index of 0.1 to 500 and said ethylenically unsaturated monoester is at least one compound selected from the group consisting of vinyl acetate, methyl acrylate and ethyl acrylate.

3. The hotmelt composition according to claim 2 wherein said copolymer of ethylene and ethylenically unsaturated monoester is ethylene-vinyl acetate containing 55 to 95% by weight of ethylene and has a melt index of 2.5 to 400.

4. The hotmelt composition according to claim 1 further containing wax in an amount not exceeding three times the total weight of said tackifier and said copolymer of ethylene and ethylenically unsaturated monoester.

* * * * *